Dec. 17, 1963  J. A. CLARK  3,114,806
PRESSURE RESPONSIVE SWITCH FOR A SLIDE PROJECTOR
Filed Feb. 16, 1959  6 Sheets-Sheet 1

INVENTOR.
JAMES A. CLARK
BY
*J. A. Ellestad*
*B. A. Chiara*
ATTORNEYS

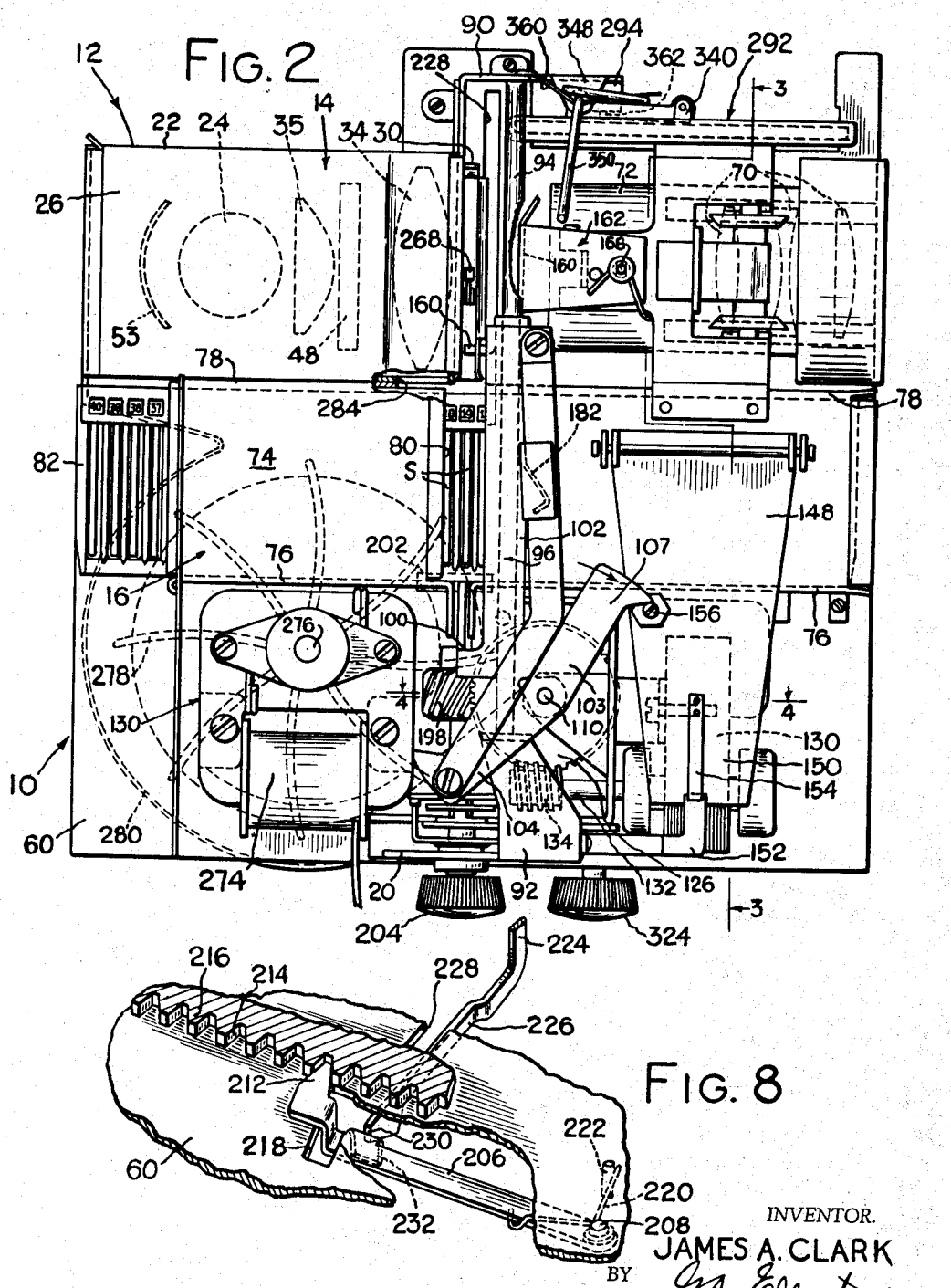

INVENTOR.
JAMES A. CLARK
BY H.A. Ellestad
B.A. Chiama
ATTORNEYS

Dec. 17, 1963   J. A. CLARK   3,114,806
PRESSURE RESPONSIVE SWITCH FOR A SLIDE PROJECTOR
Filed Feb. 16, 1959   6 Sheets-Sheet 4
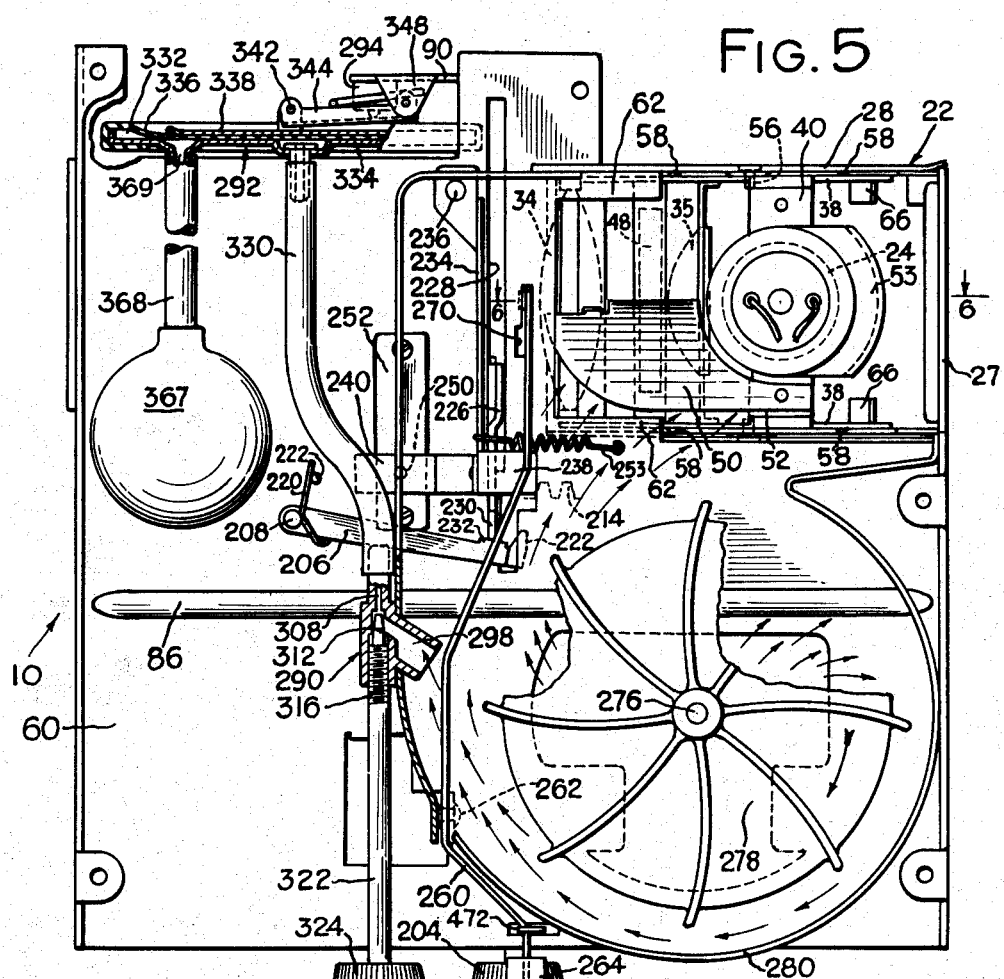
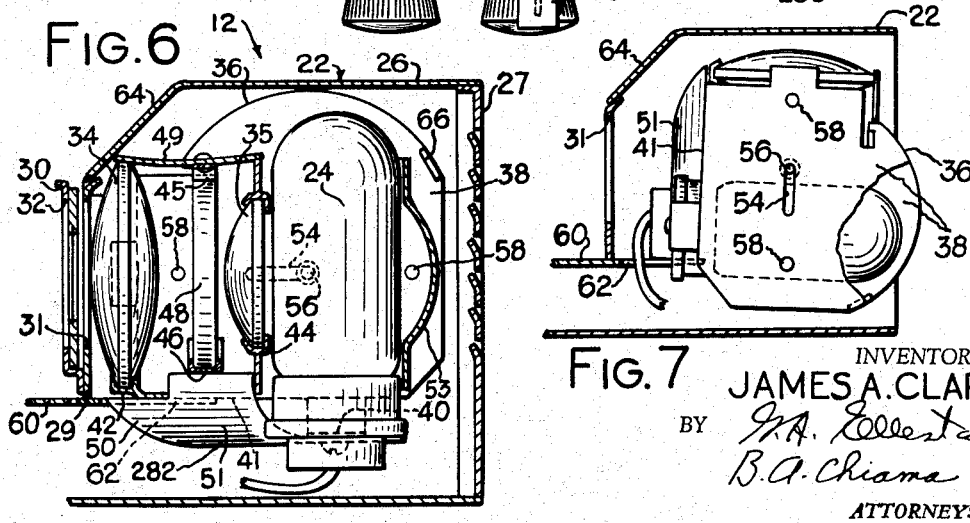
INVENTOR.
JAMES A. CLARK
BY
ATTORNEYS

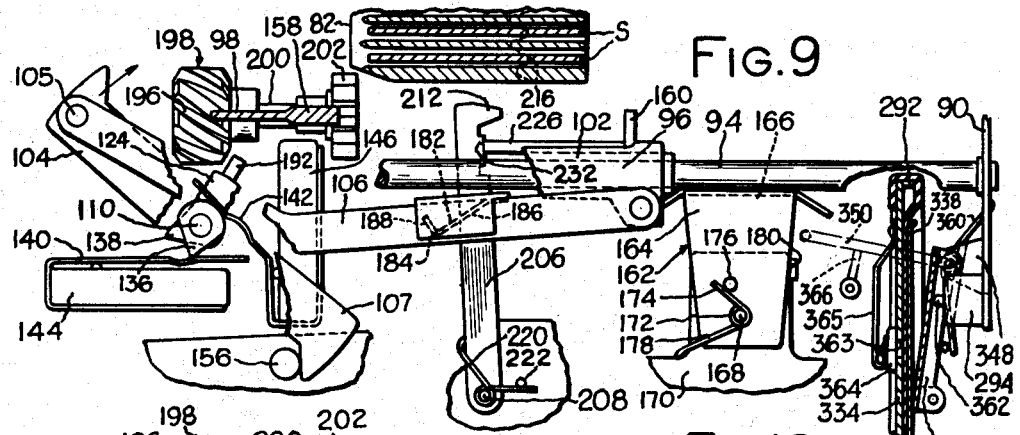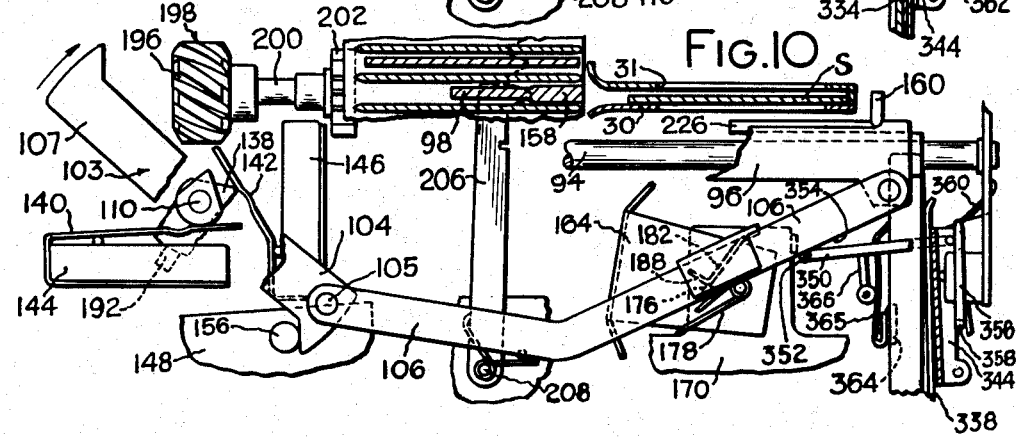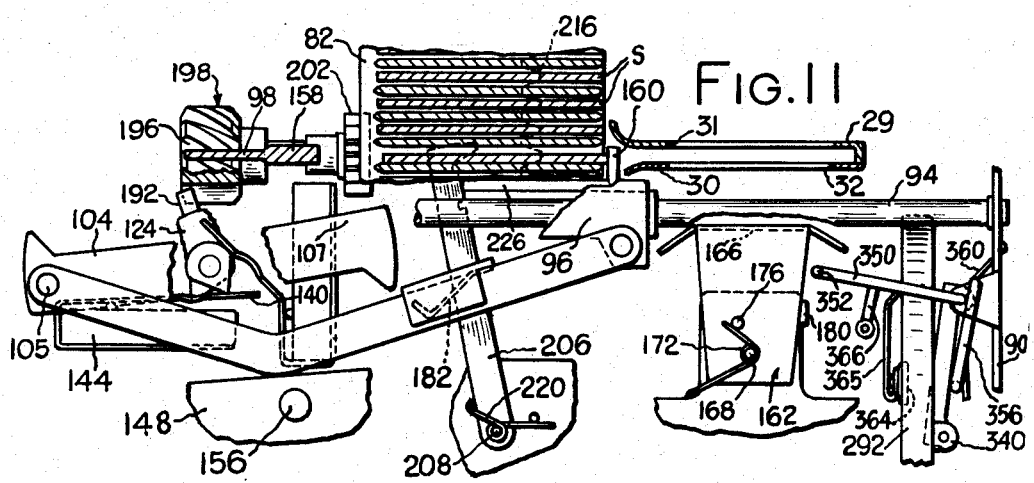

Dec. 17, 1963  J. A. CLARK  3,114,806
PRESSURE RESPONSIVE SWITCH FOR A SLIDE PROJECTOR
Filed Feb. 16, 1959  6 Sheets-Sheet 6
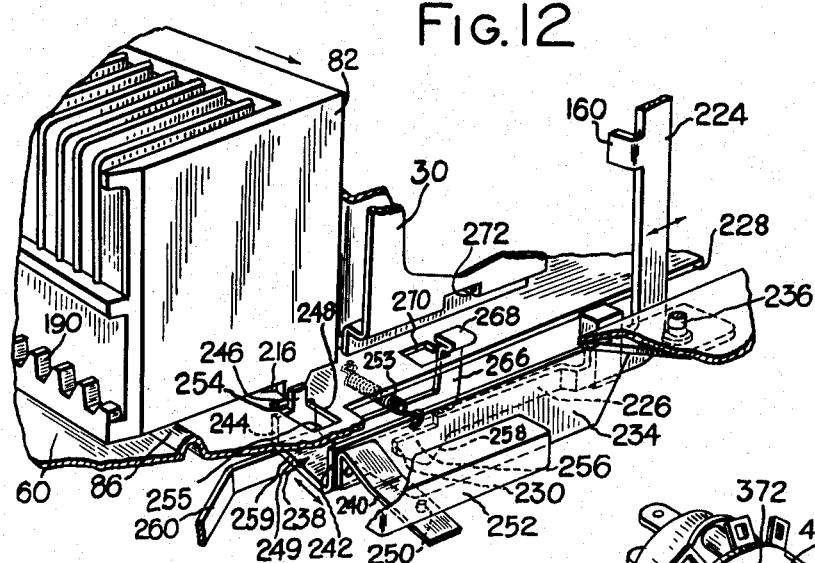
FIG. 12
FIG. 13
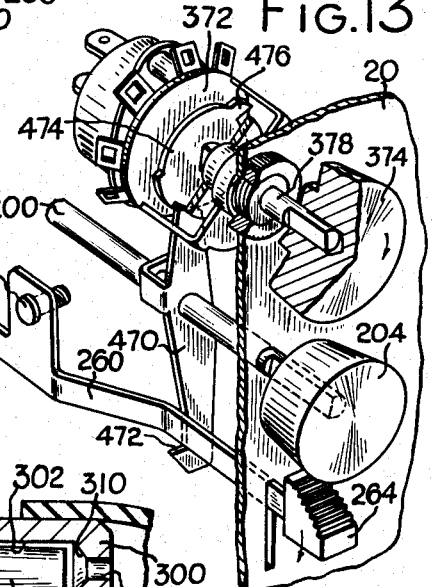
FIG. 14
INVENTOR.
JAMES A. CLARK
BY
ATTORNEYS

United States Patent Office 3,114,806
Patented Dec. 17, 1963

3,114,806
PRESSURE RESPONSIVE SWITCH FOR A
SLIDE PROJECTOR
James A. Clark, Brighton, N.Y., assignor to Bausch &
Lomb Incorporated, a corporation of New York
Filed Feb. 16, 1959, Ser. No. 793,569
1 Claim. (Cl. 200—83)

The present invention relates to projection apparatus and, more particularly, to a slide projector for projecting transparencies such as slides.

In instruments of this general character, there is usually employed a number of integrated mechanisms which cooperate to perform the desired result of semi-automatic or automatic projection. To this end, there is usually provided a slide pickup and return mechanism, an automatic timer control, a slide tray indexing or feeding device, and a circuit having various switches which are actuated in predetermined sequences to maintain automatic action. The present invention contemplates an improvement in each of the above features. Therefore, it is the principal object of the present invention to provide an improved automatic slide projector embodying various improved features inherent therein.

Another object of the present invention is to provide a single unified and compact structure which is adapted to receive a slide tray carrying a relatively large number of transparencies and individually remove each of the transparencies from the slide tray, project the transparency, return it to its former position in the tray, and advance the tray for another cycle of projection.

Still another object of the present invention is to provide an improved slide projector which may perform the operation in the last-mentioned object semi-automatically or automatically, and be able to project single slides with or without the use of a tray.

Further objects and advantages will be apparent to those skilled in the art by reference to the following specification and accompanying drawings wherein:

FIG. 2 is a plan view of the projector of FIG. 1;

FIG. 5 is a bottom view of the projector shown in FIG. 2;

FIG. 6 is a partial sectional view of the light source;

FIG. 7 is a fragmentary elevational view of the light source housing showing a position which the housing may assume;

FIG. 8 is an enlarged perspective view of the tray locking device utilized in the present invention;

FIGS. 9, 10 and 11 are fragmentary views of the slide changing mechanism in various positions of operation;

FIG. 12 is a fragmentary view in perspective of the tray holding and release mechanism;

FIG. 13 is a fragmentary view in perspective showing the index lever locking means;

FIG. 14 is a fragmentary view of the control valve for the automatic timer mechanism utilized in the present invention.

Figure 1:
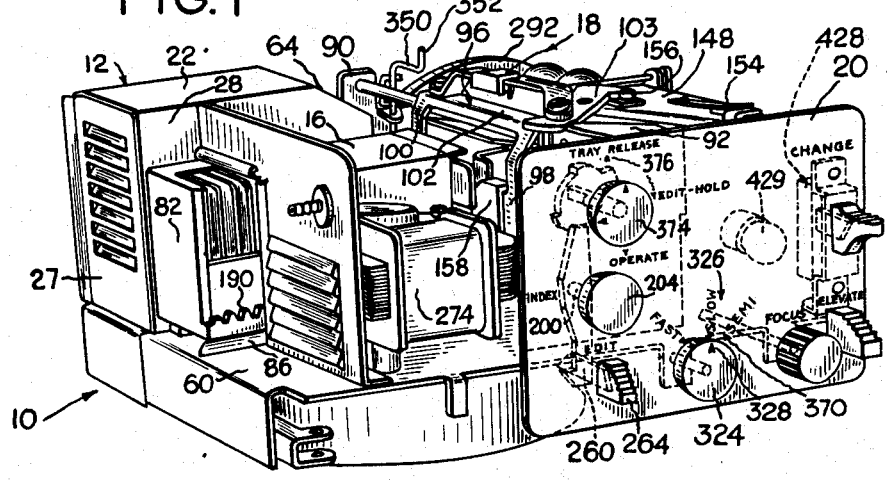
FIG. 1 is a perspective view of a slide projector embodying the various features of the present invention with the casing or cover removed.

Referring to the drawings and more particularly to FIGS. 1 and 2, there is shown a slide projector having a base 10 for mounting a suitable decorative cover cabinet (not shown) and for mounting the various mechanisms of the present invention. Arranged on the base 10 is a light source 12, a projection system 14, a slide tray holder 16, slide pickup and return mechanism 18 and a control panel 20 for supporting various electrical control devices.

Referring now to FIGS. 5, 6 and 7 for a more detailed description of one of the various mechanisms of the present invention, the light source 12 is shown as including a housing or shield 22 which is suitably mounted on the base 10 and serves to protect a conventional projector lamp 24. The housing has a top plate 26, a removable rear wall 27, two side walls 28 and a front wall 29 which has a slide receptacle 30 for holding a slide S when the same is in projection position. The wall 29 and the receptacle 30 are formed with aligned apertures 31, 32, respectively, through which light is projected from the lamp 24 by a system of condensing lenses 34, 35. The lenses 34, 35 and the lamp 24 are mounted in a cell 36 which is contained in the housing 22 and is adapted for sliding and pivotal movement relative thereto. The cell 36 comprises side plates 38 which are held in spaced relation by a wide strap 40 bridged across and secured to the lower edges 41 of the plates 38 and by a pair of narrow lens straps 42, 44 secured at their respective ends to the inner surfaces of the plates 38. The lens strap 42 suitably supports the lens 34 while the strap 44 supports the lens 35. An upper channel member 45 and a lower channel member 46 are also mounted at their ends between the plates 38 and serve to support a heat-absorbing glass plate 48. As shown in FIG. 6, the lenses 34, 35 and the glass plate 48 are retained in their respective supporting members by a tie strap 49 secured to the channel 45 and extending across the lenses to prevent accidental upward displacement of the lenses.

The lamp 24 is mounted on the strap 40 which also supports an air turning vane 50 positioned underneath the cell 36. The vane extends from the strap toward the wall 30 and has one edge lying on a line parallel to the longitudinal axis of the cell 36. Starting from this edge, the vane curves downwardly and horizontally to form a straight portion 51 having an edge 52. The purpose of this vane will be described during the description of the cooling system for the projector. Between the plates 38 at the ends thereof adjacent the lamp 24 there is mounted a suitable reflector 53 for the lamp.

As previously stated, the cell 36 is adapted for sliding and pivotal movement relative to the housing 22 in order to permit easy removal of the lamp 22. To this end, each of the plates 38 is formed with a slot 54 located intermediate the ends and along the longitudinal line of the respective plate. An upwardly projecting pin 56 secured to each of the walls 28 of the lamp housing 22 projects through an adjacent slot 54 for permitting sliding and rotatable movement of the cell plates 38 and consequently the cell 36 relative to the housing 22. Suitable projections 58 formed on the outer surfaces of the plates 38 frictionally engage the inner surfaces of the adjacent housing walls 28 whereby the cell is frictionally maintained in any position in which it is moved.

In order to maintain its projection position, as shown in FIG. 6, the cell 36 is supported on the deck 60 of the base 12 by a pair of ledges 62 formed integral with the deck and projecting into the housing 22 for a short distance. The forward portions of the lower edges 41 of the plates 38 rest upon the ledges 62 when the cell 36 is in the position shown in FIG. 6. To prevent backward tilting of the cell, the forward end of the tie strap 49 engages the slant portion 64 of the top plate 26 of the housing. To remove the lamp 24, the operator would remove the end wall 27, grasp the tabs 66 secured to the plates 38, pull the cell straight back, or to the right as viewed in FIG. 6, until the forward end of the slots 54 abuts their respective pins 56 and then exert a downward force on the end of the cell to permit pivoting thereof about the pins 56. In this operation, the forward end of the tie strap 49 will be clear of the slant portion 64. It is preferable that the projections 58 may exert enough friction on the walls 28 to require a relatively large manual force for moving the cell as outlined so as to prevent inadvertent movement thereof while the cell is in projection position. With the cell 36 in the position shown in FIG. 7, the lamp 22 may be removed through the opening made available by the removal of the end wall 27.

In axial alignment with the lamp 24 and the condensing lenses 34, 35 is a focusing lens system 70 shown in FIG. 2 as housed in a suitable tube enclosure 72 which together with the condensing lenses comprise the optical system 14. A focusing mechanism (not shown) may be utilized to move the projection lens system 70 toward or away from the condensing lenses. Further descritpion of the focusing mechanism is unnecessary since its operation will become immediately apparent to those skilled in the art.

As noted in FIG. 2, the axis of the projection system comprising the lamp 24, the lenses 34, 35 and the tube 72 is slightly offset with respect to the center line of the base 10 in order to accommodate a tray carrying a plurality of slides. Immediately adjacent to the projection system and having its axis parallel with the axis of the projection system is the slide tray holder 16 which is suitably mounted on the deck 60 of the base 10. As shown in FIG. 2, the tray holder is formed as an integral three-sided longitudinally extending box having a top 74 and two sides 76, 78. Actually, the holder 16 comprises two identical box-like structures in axial alignment and provided with an open area or slot between adjacent ends for permitting egress and ingress of slide transparencies. This is seen in FIG. 2, where a slot 80 is located intermediate the ends of the holder 16. For purposes of this invention and further description thereof, the holder is considered to be a unitary structure formed with a slot intermediate its ends.

The slide tray holder is designed to slidably support a slide tray 82 which may be inserted at one end of the holder (left as viewed in FIG. 2) and drawn out at the other end. The tray is constructed with a bottom support plate 84 which rests upon a longitudinally extending ridge 86 formed on the deck 60 and a side wall 88 (see FIG. 3). Advancing mechanism for moving the tray through the holder in a step-by-step fashion will be described hereinafter.

The slide pickup and return mechanism 18 comprising a slide transfer device will now be described in detail. Mounted adjacent to the opposing sides of the base 10 and in a transverse plane with respect to the axis of the tray holder 16 is a pair of uprights 90, 92 which serve to support the mechanism 18 above the base 10. Each of the uprights 90, 92 is provided with an opening, respectively, for receiving one end of a slide rod 94. A U-shaped slide transfer element 96 is slidably mounted on the rod 94 and is provided with downwardly depending leg portions 98, 100, integrally formed at the ends of the bight portion 102 of the element 96. Suitable openings formed in the leg portions 98, 100 are adapted to receive the rod 94 for permitting sliding movement thereon. It will be apparent that the transfer element 96 is movable between two positions on the rod 94, that is, between a projection position such as shown in FIG. 10 and a pickup or return position shown in FIGS. 2, 3 and 9.

Reciprocable movement of the transfer element 96 on the rod 94 is effected by means of a drive mechanism which includes a rotatable crank 103 having an arm 104 pivotally connected at 105 to one end of a link 106 which has its other end pivotally connected to the bight portion 102 of the element 96 adjacent the leg 98. The crank 103 is also provided with a second arm 107 positioned at 180° from the arm 104 and is made integral on a sleeve 108.

Figure 4:
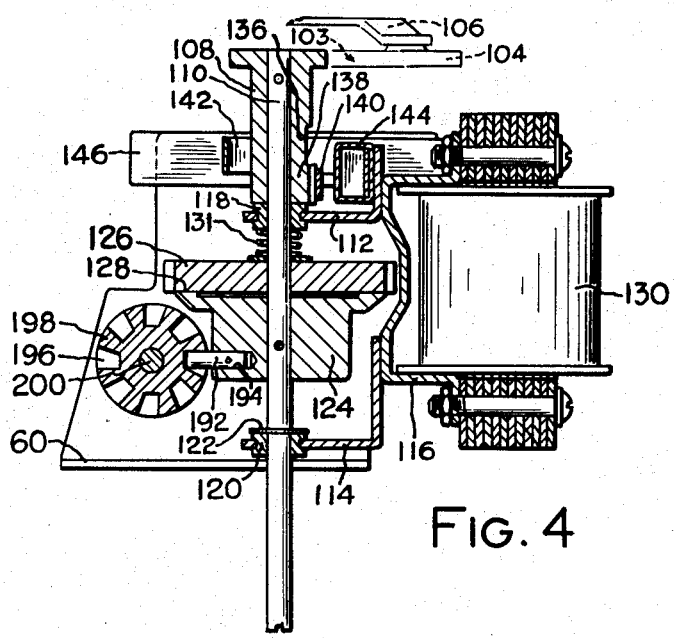
FIG. 4 is a partial sectional view taken along the line 4—4 in FIG. 2.

This sleeve is mounted on a shaft 110 held in a vertical position by a pair of vertically spaced bearing supports 112, 114 secured to an upwardly extending support 116 secured to the base 10. As shown in FIG. 4, each of the supports 112, 114 is provided with a bearing 118, 120, respectively, in which the shaft 110 is slidably received. The lower end of the shaft has secured thereto a washer 122 which slidably rests upon the bearing 120 for preventing the shaft from falling downwardly in its support. Also secured to the shaft 110 is a clutch sleeve 124 located between the bearings 118, 120, and immediately above this sleeve is a gear 126 which slidably receives the shaft 110. A circular surface 128 on the sleeve 124 is adapted to engage the adjacent face of the gear 126 for imparting rotation to the former during positive driving of the latter. A light coil spring 131, held in compression between the upper bearing 118 and the gear 126, serves to maintain the frictional engagement between the sleeve clutch surface 128 and the gear 126.

Rotation of the shaft 110 and consequently the crank arm 104 is effected by an electric motor 130 having a drive shaft 132 and a worm gear 134 connected thereto and in operative engagement with the gear 126. Upon rotation of the shaft 132, the gear 126 will be correspondingly rotated and because of the spring induced frictional engagement between the gear 126 and the clutch sleeve 124, the rotation will be imparted to the shaft 110. During operation of the projector, there are occasions when the rotation of the shaft 110 is abruptly stopped and before the motor shaft 132 is able to come to a complete stop for reasons of the inertial effects on the armature of the motor 130. In these events, the rotation of the gear 126 would have stopped along with the rotation of the shaft 110, however, the rotation of the sleeve 124 may continue for a short duration while the motor 130 is coming to rest. In effect then, the slippage connection between the gear 126 and the sleeve 124 allows the motor to come to a gradual stop rather than an abrupt stop, thereby eliminating damage thereto.

As shown in FIGS. 4, 9, 10 and 11, a pair of vertically spaced cams 136, 138 are made integral with the sleeve 108 and each of these cams is cooperable with a leaf spring lever 140, 142. The lever 140, when flexed by the cam 136, opens a normally closed load limit switch 144 while the lever 142, when flexed by the cam 138, opens a normally closed projection limit switch 146. The functioning of these cams and switches will be described hereinafter.

Abrupt braking of the rotation of the crank 103 when the transfer element 96 is in either the projection or pickup positions is accomplished by means of an armature in the form of a plate 148 pivotally mounted at one end to the top 74 of the tray holder 16. The other end 150 of the plate 148 extends over the motor 130 and is adapted for limited arcuate movement in a vertical plane between a stop member 152 secured to the frame of the motor and extending over the end 150 and the motor itself. A leaf spring 154 secured at one end to the top of the armature 148 and engageable with the top of the stop 152 prevents sudden slamming of the armature against the motor while at the same time continuously biasing the end 150 in an upward direction against the stop 152. A pin 156 is secured to the upper surface of the armature 148 and is cooperable with the ends of each of the arms 104 and 107 for braking rotation of the crank 103. When the motor 130 is energized for rotating the gear 126, the magnetic flux surrounding the motor is sufficient to attract the armature 148 for rotating the same downwardly against the bias of the spring 154. This movement of the armature will be sufficient to clear the engagement of the pin 156 with respect to either of the arms 104, 107 and thereby permit rotation of the gear 126. When the motor 130 is deenergized, the armature will be forced upwardly for carrying the pin 156 in the path of either of the arms 104, 107 whereupon the rotation of the crank 103 and consequently the gear 126 will be positively and abruptly stopped. The mechanical relationship between the transfer element 96, the link 106, the crank 103 and the pin 156 is such that this positive stoppage occurs when the transfer element is in either of its extreme positions on the rod 94.

It will be apparent from the foregoing description that rotation of the crank 103 will cause reciprocation of the transfer element 96 between a slide pickup or return position to a projection position opposite the slide receptacle 30 of the projection system. The depending leg 98 of the transfer element 96 has secured at one end thereof a slide engaging pad 158 for moving a slide back into the tray 82 after the slide has been projected. Similarly, the depending leg 100 has secured at its lower end a pad 160 for engaging a slide when the transfer element is moving to the projection system. During operation, the legs 98, 100 move in a plane parallel to the axis of the rod 94 for moving a slide between pickup and projection positions.

In FIG. 9, the parts of the transfer mechanism are shown in a pickup or load position, where the transfer element 96 is in pickup position and the pad 158 is disposed to be moved through the tray 82 for engaging a slide S. At this point, the motor 130 is deenergized and the crank 103 is in the position indicated. It will be noted that the arm 107 is in engagement with the pin 156. Upon energization of the motor 130, the armature 148 will be attracted by the magnetic flux of the motor to cause the lowering of the pin 156 thereby freezing the crank 103 for rotation.

In FIG. 10, the crank 103 has rotated 180° or one-half turn and in so doing has moved the transfer element to the projection position. The element 96 has moved the slide S therewith so that the latter is in position within the receptacle 30 for projection by the system 14. It will be noted that the pad 158 is not in contact with the slide in this illustration of the parts. During rotation of the arm 104 from its position shown in FIG. 9 to the position shown in FIG. 10, the transfer element 96 would have moved to a position farther to the right than what is shown in FIG. 10 since the effective total length of the arm 104 and the link 106 is greatest when the arm 104 is approximately parallel to the rod 94 and on the same side of the axis of the shaft 110. In FIG. 10, the pad 158 is shown on its way back to the starting position indicated in FIG. 9 since the arm 104 has been rotated slightly beyond the point where the same is parallel to the rod 94.

The parts shown in FIG. 10 are again immobile while the slide S is in projection position. As will be described hereinafter, at certain conditions of operation, the motor 130 would be deenergized and the pin 156 in engagement with the arm 104. After projection of the slide S, the motor 130 may again be energized to attract the armature 148 and to rotate the crank 103 for driving the transfer element to a return position as shown in FIG. 11. In moving to this position, the pad 160 would have contacted the edge of the slide S to move the same therewith back into the tray 82. As noted in FIG. 11, the slide has not quite come to rest since the arm 104 has not reached a position parallel to the rod 94 and on the opposite side of the axis of the shaft 110 whereat the effective length of the crank 103 and the link 106 is a minimum. The additional rotation of the crank 103 from the position shown in FIG. 11 to that shown in FIG. 9, would have carried the transfer element 96 to its extreme position and slightly toward the projection position as is the case when the parts are positioned as shown in FIG. 9. This carry over or override of the element 96 will permit the movement of the pad 160 away from the tray 82 to prevent any interference therewith during indexing of the tray.

Cooperable with the movement of the link 106 is a shutter 162 which is formed with a horizontally extending plate 164 having a vertically depending shutter plate 166 at one end. The other end of the plate 164 is pivotally mounted by a pivot pin 168 on an upright 170 of the base 10, as shown in FIGS. 9–11. The shutter plate 166 is adapted for pivotal movement between a light intercepting position wherein the shutter is in alignment with the apertures 31, 32 of the housing 22 and a position wherein the shutter is out of this alignment, such as shown in FIG. 10. A torsion spring 172 is wrapped around the pivot pin 168 and has one arm 174 thereof biased against an anchor pin 176 secured to the plate 164 and the other arm 178 attached to the upright 170. A stop 180 secured to the upright 170 is adapted to engage one edge of the plate 164 to prevent rotation of the shutter in one direction under the bias of the spring 172 while permitting rotation of the same in the other direction.

Normally, the shutter 162 is biased to its light intercepting position by the spring 172 as the arms of the latter are in tension against their respective anchors, namely, the pin 176 and the upright 170. In order to pivot the shutter into and out of its operating position, there is provided on the under surface of the link 106 a leaf spring 182 which is bent at point 184 to form legs 186, 188. The leg 186 has one end fastened to the link 106 for supporting the spring 182 while the free bent leg 188 is free at its end to permit flexing of the spring. The spring 182 is adapted to engage the pin 176 on the shutter during both passes of the link 106, that is, during movement of the link in either direction. In moving the transfer element 96 to the projection position, that is, from the position shown in FIG. 9 to that of FIG. 10, the leg 186 of the spring 182 will engage the pin 176, however, since the plate 164 is against the stop 180, the spring 182 will merely flex as the leg 186 slides off of the pin 176. On the return pass of the link, as shown in FIG. 10, the other leg 188 of the spring will engage the pin 176 to force the same and the shutter into pivotal movement out of its light intercepting position.

The indexing mechanism for the present invention is best seen in FIGS. 4, 9, 10 and 11 and is cooperable with a rack 190 formed on the bottom plate 84 of the tray 82 for advancing the same in a step by step fashion automatically or manually as the case may be.

As previously stated, the rotation of the shaft 110 will impart rotation to the clutch sleeve 124. Radially projecting from the sleeve 124 is an actuator pin 192 secured within a bore 194 and being adapted for rotation about the axis of the shaft 110 during rotation of the latter. The pin 192 is adapted to be received within any one of a plurality of grooves 196 of a helical index gear 198 secured to a shaft 200 rotatably mounted horizontally on the panel 20. A gear 202 secured to one end of the shaft 200 is cooperable with the rack 190 formed on the tray 82. The pitch of the grooves 196 on the helical gear 198 is such that rotation of the latter an angular distance equal to the pitch will advance the tray 82 a distance equal to the distance between two adjacent slides S. For every full rotation of the clutch sleeve 124, the pin 192 will be received within and slide along one of the grooves 196 for rotating the gear 198 and advance the tray.

The cooperation of the slide tray indexing mechanism with the slide pickup and return mechanism as illustrated schematically in FIGS. 9, 10 and 11. In FIG. 9, the pin 192 is shown out of engagement with the gear 198 and the slide transfer element 96 in position to pick up a slide, assuming of course that the tray 82 is in position for permitting the pickup. As the crank 103 is rotated clockwise to the position shown in FIG. 10, the transfer element 96 has moved to the right for projection of the slide S and the pin 192 has also been rotated clockwise along with the clutch sleeve 124. In FIG. 11, after further clockwise rotation of the crank 103, the pin 192 has been rotated and has just entered one of the notches 196 of the gear 198. In this position of the parts, the transfer element 96 has returned the slide S to the tray and the gear 198 is about to be rotated under the driving force exerted by the passage of the pin 192 along the groove 196. Further rotation of the clutch sleeve 124 will rotate the gear 198 to effect advancement of the tray to the next slide. Continuous cycling of the transfer mechanism under the action of the motor 130 will automatically cause rotation of the gear 198 to advance the tray. A knob 204 secured at the other end of the shaft 200 remote from the gear 202 may be utilized to effect manual indexing or advancement of the tray.

In order to positively lock the tray into position during projection of a slide, there is provided a locking lever 206 pivoted at one end at 208 to the underside of the deck 60. The other end of the lever is formed with a prong 212 which is adapted to be received within the notches 214 of a rack 216 formed on the under surface of the support plate 84 of the tray 82. The prong 212 lies in a plane slightly offset with respect to the main portion of the lever 206 and protrudes through a slit 218 formed in the deck 60. A torsion spring 220 having one end fastened to the lever 206 is wrapped around the pivot 208 and anchored at the other end to a pin 222 secured to the deck for normally biasing the lever into engagement with one of the notches 214. In order for the indexing mechanism to advance the tray 82, the locking lever 206 must be rotated against the bias of the spring 220 as the index gear 198 is rotating. To this end, the depending leg 100 of the transfer element 96 has a vertical extension 224 which terminates in a horizontally disposed arm 226 and is movable with the transfer element. The arm 226 is movable horizontally in a line slightly below the plane of the deck 60 and to accommodate this movement, the deck is formed with a slot 228 through which the arm 226 extends and which is in alignment with the movement thereof. As shown in FIGS. 8, 9, 10 and 11, the extreme outer tip 230 of the arm 226 is adapted to abut a protrusion 232 formed on the locking lever 206 when the transfer element 96 has moved to the pickup position and thereby rotates the lever out of engagement with the rack 216 for permitting indexing of the tray 82 as aforesaid.

Tray holding and release means are also provided on the projector for preventing the movement of the tray 82 beyond a position within the holder 16 wherein the tray will be disposed for operation, that is, where the entry end of the tray is in position for permitting the removal of the first slide. The purpose of this means is to insure that the other structure of the projector is in condition and in proper relationship to accept the projection of the slides thereby rendering the projector safe for operation against the possibility of damage to the other structure. Another purpose is to provide a positive stop for the movement of the tray in order to insure that the first slide in the tray will be projected. This means will not permit the movement of the tray into an initial operating position unless the transfer element 96 is in a pickup or load position wherein the slide engaging pads 158, 160 are clear of the movement of the tray.

Figure 3:
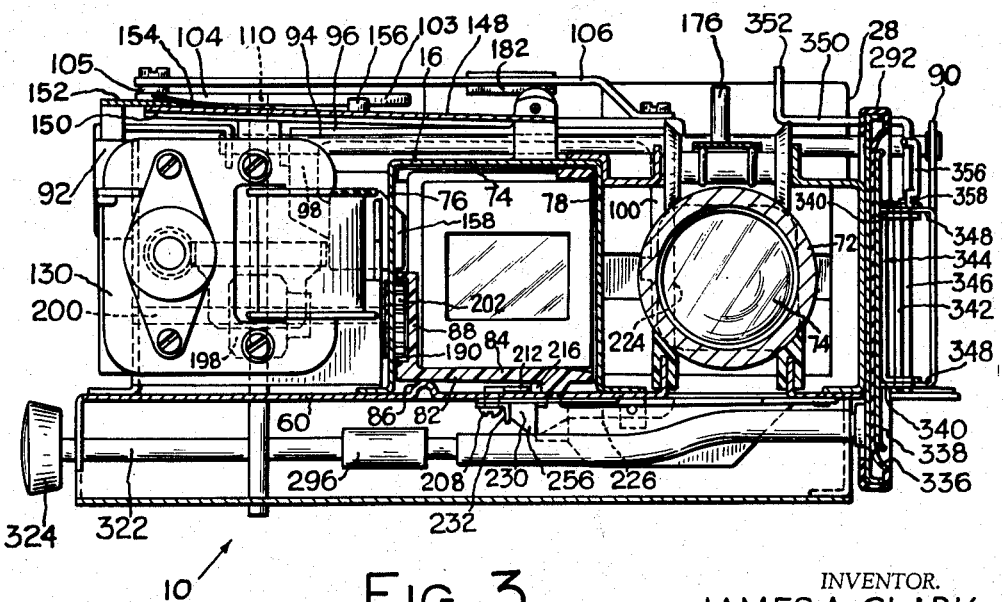
FIG. 3 is a sectional view taken along the line 3—3 in FIG. 2.

As shown in FIGS. 3, 5 and 12, a lever 234 is pivoted loosely on a pivot pin 236 secured to the under surface of the deck 60. The lever 234 extends below the plane of the deck and parallel to the slot 228, terminating in an element comprising a U-shaped member 238 and a leaf spring 240. The member 238 is formed with a first upstanding leg 242 to which the lever 234 is integral with and a spaced second upstanding leg 244 which terminates in a narrow stop plate 246. The stop projects through a slot 248 formed in the deck 60 and is adapted to engage the leading or entry end of the rack 216 of the tray 82. The leg 244 is shorter than the leg 242, exclusive of the stop 246, and both legs end in a plane parallel to the plane of the deck 60. A bight portion 249 between and joining the legs slopes downwardly toward the longer leg 242. The leaf spring 240 is secured at one end to the leg 242 and extends generally in the line of the legs of the member 238 but on the side of the lever 234 remote from this member. As shown in FIG. 12, the spring 240 is slightly bent or tapered downwardly and is adapted to actuate, in certain positions thereof, the contact button 250 of a microswitch 252 mounted on the underside of the deck 60. The lever 234, the member 238 and the spring 240 resembles a T-shaped structure with the spring and the member disposed as arms of the T.

A coil spring 253 is connected at one end to the lever 234 and at the other end to the deck 60 and normally biases the lever in a direction to force the stop 246 against a side 254 of the slot 248 adjacent the entry side of the tray holder 16. Upon movement of the tray 82 through the holder 16, the leading end of the rack 216 will first engage the stop 246, then move the member 238 against the bias of the spring 254 until the stop 246 abuts against the other end 255 of the slot 248 wherein further movement of the tray is prevented. With the tray against the stop and the stop against the slot end 255, the first slide S is in alignment with the pickup pad 158, that is, in a pickup position. The location of this end of the slot on the deck 60 will be determined by the thickness of the end wall of the tray and the distance between the first slide and this end. In so moving, the spring 240, which is normally in pressing engagement with the contact button 250 for one condition of operation of the projector, will be moved in the direction of movement of the tray, as seen in FIG. 12, without affecting the initial condition of the switch.

In order to release the positive stopping effect of the stop 246 when the same is against the end 255 of the slot 248, the lever 234 is adapted for limited pivoting in a plane transverse to the plane of the deck 60 in order to lower the member 238 a sufficient distance for the stop 246 to clear the rack 216. The arm 226 is provided with a triangular sided cam 256 on the lower edge thereof adjacent the extreme tip 230, which cam is adapted to always travel between the legs 242, 244 of the member 238 regardless of the positions of the member as determined by which end of the slot 248 the stop 246 may be against. When the stop 246 is against the end 255 of the slot 248, the cam 256 will pass adjacent the leg 244 which is short enough to permit sliding engagement of the trailing edge 258 of the cam upon the adjacent edge 259 of the bight portion 249 when the arm 226 is being moved from the pickup or load position toward the projection position along with the transfer element 96. The angular edge 258 slides along the edge 259 and, in so doing, the member 238 is lowered as the extreme lower apex of the cam 256 rides across the upper surface of the bight portion.

Lowering of the member 238 moves the stop 246 downwardly out of the path of the leading end of the rack 216 and also separates the spring 240 from the button 250 of the switch 252 to thereby actuate the same to another condition of operation, as will be described more fully hereinafter. As previously stated, the tip 230 of the arm 226 serves to pivot the locking lever 206 out of engagement with the rack 216 when the transfer element 96 approaches projection position. During this operation, the extreme lower apex of the cam 256 rides upon the upper surface of the bight portion 249 and the actuator pin 192 is about to commence its run through the groove 196 of the index gear 198 for rotating the gear 202 to advance the tray. While the transfer element 96 is moving the slide to a projection position, the cam 256 will slide off of the member 238 but since the tray has been advanced somewhat, the stop 246 will engage and slide along the smooth surface of the side of the rack 216 instead of occupying its position of obstruction in advance of the tray. The spring 253 will force the member 238 back into its original position whereat the stop 246 will abut the slot end 254. Once the tray has passed the stop 246, the contact button 250 will remain in its second condition of operation and the related structure of the lever 234, the member 238 and the spring 240 will maintain its lowered position.

With the stop 246 against the slot end 254, the low portion of the bight 249 adjacent the leg 242 will be far enough below the lower apex of the cam 256 that the same will not come in contact with the bight. During continuous reciprocation of the transfer element 96, while the tray is being advanced through the tray holder 16, the cam 256 will merely pass over the bight without interference. During the operation of the above-described structure, the lever 234 is loosely pivoted in two planes and this may be accomplished by providing the pivot 236 with a spring washer for permitting limited vertical and horizontal pivoting of the lever. It will be understood that the stop plate 246 may engage the leading end of the tray 82 at places other than at the end of the rack 216 in the event that a rack is not provided. In this event, it is contemplated that the stop plate may slide along a smooth surface of the bottom plate of the tray, or even along a corner thereof. It is also contemplated that the tray holding and release mechanism may be arranged in other positions relative to the tray instead of the disclosed location upon the deck 60.

The present projector is also provided with an edit mechanism for permitting the removal of a slide while the same is in projection position within the receptacle 30. The edit mechanism comprises a relatively long lever 260 positioned under the deck 60 and running generally normal to the optical axis of the projection system 12. The lever 260 is pivoted near one end on a pivot 262 which is suitably mounted below the deck 60 and projects through a slot formed in the panel 20 where it terminates in a finger-engaging tab 264. The other end of the lever terminates in a vertical leg 266 having a bent flat portion 268 located under the receptacle 30, see FIG. 12. The leg 266 projects upwardly through an opening 270 formed in the deck 60 and is movable vertically therein. During upward travel of the portion 268, the same is adapted to enter an opening 272 formed centrally in the bottom wall of the receptacle 30 and move a slide out of the receptacle through the open upper end thereof. It will be apparent that manual lowering of the finger tab 264 will thus eject a slide in the receptacle 30. In this manner slides may be viewed singly by inserting them through the open upper end of the receptacle 30 and ejecting them with the edit mechanism. Means are also provided for locking the lever 260 against rotation except for certain conditions of the projector, such means to be described hereinafter.

A cooling system for the lamp 24 and a heating system for preheating the slides before they are projected are provided in the present projector. As shown in FIGS. 1, 2 and 5, the base 10 has mounted on the deck thereof an electric motor 274 which serves to rotate a shaft 276 extending vertically downwardly through the deck. A radial flow impeller or fan 278 is mounted and secured to the remote lower end of the shaft and upon rotation of the fan, air is drawn into the base 10 and forced therethrough as shown by the arrows.

A generally circular baffle 280 is mounted within the base 10 for controlling the flow of air to the open floor of the lamp housing 22. Air is thus forced upwardly through the housing and is expelled through open louvers formed in the rear wall 27 of the housing. In so moving, the air will cool the lamp 24, the heat-absorbing plate 48 and the lenses 34, 35. The edge 52 of the turning vane 50 runs generally along the vertical mid-line of the flow of air to the lamp housing so that approximately half of the air entering the housing is deflected upwardly into the half-section of the housing immediately above the vane 50 while approximately half of the air is allowed to move beyond the vane toward the rear side wall 28 of the housing where this portion of the moving air may move upwardly into the other half section of the lamp housing. In this manner, the air moving into the housing is more evenly distributed therein.

The turning vane 50 also serves another purpose, that of directing warm air upwardly for movement into the tray holder 16. As shown in FIG. 2, the side 78 of the tray holder is formed with a slot 284 which extends the full height of this side and which exposes the edges of the slides S adjacent the one in projection position, shown in FIG. 2 as slide No. 19. Depending upon the width of the slot 284, two or three slides may be preheated by the warm air flowing from the lamp housing to thereby buckle the film before the same are moved into projection position.

Some of the air being deflected by the vane 50 flows outwardly through the aperture 31 in the front wall 29 of the lamp housing. This action serves to force a slide against the outer side of the receptacle 30 and thereby prevent the out-of-focus positioning of the slide therein.

The present projector is designed for automatic operation, that is, for repeating the cycling of operation consisting of picking up a slide from the tray 82, moving the slide into projection position and thence back into the tray. In conjunction with this automatic cycling, a pneumatic timer arrangement is provided for controlling the time interval between each cycle.

The pneumatic timer comprises a generally linear response valve 290, a bellows 292 and a normally open switch 294 arranged with the bellows to effect closing of the switch upon expansion of the bellows. In detail, as shown in FIGS. 5 and 14, the valve 290 is mounted under the deck 60 and includes a valve body 296 having an inlet 298 and an outlet nipple 300. Within the valve body there is formed a first cylindrical bore or chamber 302 and a second cylindrical bore or chamber 304 coaxial with the first chamber and separated therefrom by an annular shoulder 306. A passageway 308 formed in the nipple 300 is in communication with the chamber 302 and is separated therefrom by a conical bore 310. Movable axially within the chambers is a cylindrical valve element 312 having a tapered portion 314 at its end and a threaded portion 316 in engagement with a threaded bore 318 formed in the valve body. It will be apparent that rotation of the valve element 312 will drive the tapered portion 314 relative to the shoulder 316 to vary the annular opening 320 therebetween.

In operation, air is permitted to flow into the chamber 304 from the inlet 298, thence between the tapered surface of the portion 314 and the shoulder 306 and out the passageway 308. With this arrangement, the amount of air flowing into the passageway 308 is proportional to the area of the annular opening 320 between the portion 314 and the shoulder 306 and consequently the amount of rotation imparted to the threaded portion 316.

This latter portion is connected by a shaft 322 which projects through a suitable opening formed in the panel 20 and terminates in a knob 324. A suitable time interval scale 326 embossed on the panel cooperates with a pointer 328 on the knob for indicating desired time intervals to which the shaft 322 may be rotated. The air supply for the valve 296 is derived from the air pressure buildup in the base 10 by the fan 278, and as shown in FIG. 5 by the arrows, air, under low pressure, is permitted to enter the inlet 298. The outlet nipple 300 is connected by tubing 330 to the interior chamber 332 of the bellows 292 which comprises a rigid, circular, saucer-like plate 334 and a flexible diaphragm 336 stretched across the open end of the plate 334. A rigid circular plate 338 is secured to the central portion of the diaphragm 336 to strengthen the latter at this point. The circular edge of the diaphragm overlaps the peripheral edge of the plate 334 and is suitably cemented thereto to prevent the leakage of air from the chamber 332. It will be apparent that the flow of air into this chamber will expand the diaphragm somewhat and force the plate 338 outwardly.

A pair of ears 340 are secured to the plate 338 in spaced relation and are formed with openings which are in a line approximately parallel to a diameter of the bellows 292. Through these openings there is mounted a pivot rod 342 which serves to pivotally support a channel-shaped member 344 at one end thereof. The member 344 is pivotally supported at its other end by a rod 346 extending through the turned sides of the member and supported for pivotal movement by a pair of vertically spaced ears 348 secured to the upright 90. As seen in FIGS. 3 and 9 the rods 342 and 346 are parallel to each other and vertically disposed.

The rod 346 extends upwardly a substantial distance beyond the member 344 and has integral therewith at its upper end a crank arm 350 which is bent upwardly at its end to form a vertical portion 352. This portion is in the path of the link 106 as the same moves the transfer element 96 toward the projection position and is adapted to slidably engage an edge 354, (see FIG. 10), of the link 106 for rotating the crank arm counterclockwise as viewed in FIGS. 9, 10 and 11. Another crank arm 356 is welded to the rod 346 and has a depending portion 358 which is adapted to engage one of the turned sides of the member 344. A torsion spring 360 is wrapped around the rod 346 and has one end anchored on the upright 90 and its other end resting upon the portion 358 for biasing the crank arm 356 in clockwise rotation. The elements 346, 350 and 358 resemble a bell crank which rotates in a counterclockwise direction about the axis of the rod 346 when the edge 354 slides, in a wedging fashion, upon the portion 352. This rotation rotates the crank arm 356 in a clockwise direction and consequently relieves the pressure upon the member 344 caused by the bias of the spring 360.

With the pressure upon the member 344 relieved, the bellows 292 is free to expand during the introduction of air into its chamber 332. When the quantity of air within the chamber is at a predetermined amount, the plate 338 will have moved sufficiently to pivot the member 344 about the rod 346 to actuate a contact button 362 of the switch 294. The button 362 is in engagement with the member 344 and is movable to either of its controlling positions depending upon the quantity of air within the bellows 292. Actuation of the switch 294 when the quantity of air has reached a predetermined amount will energize the motor 130 for moving the transfer element 96 from its projection position to the load position.

A relief valve is provided for permitting the exhausting or venting of the bellows 292 after a cycle of movement of the transfer element as initiated by the actuation of the switch 294. As shown schematically in FIG. 9, the relief valve comprises an opening 363 formed in the plate 334 of the bellows 292 and a flat valve element 364 normally biased to close the opening 363 when the transfer element is in projection position to prevent the escape of air from the bellows during the introduction of air thereinto, and to move away from the opening when the transfer element moves out of this position. The valve element 364 is biased to a closed position by a leaf spring 365 anchored at one end of the plate 334 and is held in closed position by a strut 366 secured to the crank arm 350 and engageable thereby during movement of the transfer element to the position shown in FIG. 10. When the transfer element 96 is moved out of the projection position and the strut 366 is out of engagement with the valve element 364, the torsion spring 360 will rotate the member 344 in a clockwise direction and consequently force the plate 338 inwardly of the bellows to drive the air therefrom through the relief valve. In this manner, all air is expelled from the bellows which will then be in condition for another cycle of operation.

The operation of the timer mechanism commences when the transfer element is in projection position and a slide so moved thereby in being projected. When moving to this position, the edge 354 of the link 106 will have engaged and rotated the crack arm 350 from a position shown in FIG. 9 to the position shown in FIG. 10. The relief valve 363, 364 is closed and the air, from a previous cycle of operation, has been expelled from the bellows. Assuming the time indicating knob 324 has been turned to a predetermined time interval in order to set the size of the opening 320 in the valve 296, air will flow through this valve, through the tubing 330 and into the chamber 332 of the bellows. The size of the opening 320 will determine the time required to expand the bellows sufficiently to actuate the switch 294. When the predetermined time interval has lapsed, the bellows will actuate the switch 294 whereupon the motor 130 will become energized by a circuit to be described hereinafter. Energization of the motor will move the transfer element 96 out of projection position and permit the clockwise rotation of the crank arms 350, 356 under the action of the spring 360. In this action, the positive holding effect of the strut 366 is removed from relief valve 363, 364 which will be forced open under the combined action of the spring 360 and the plate 338 for driving air from the bellows. In the meantime, the transfer element will return the slide, pick up another and move the same to projection position. In so doing this, the crank arm 350 engages the edge 354 to close off the valve 363, 364 and the system is once again ready to cycle.

Remote manual actuation of the timer switch 294 may be accomplished by a compressible bulb 367 and tubing 368 connected to a nipple 369 formed on the plate 334 of the pneumatic cell 292. The size of the bulb is such that squeezing the same will expand the cell sufficiently to actuate the switch 294 as previously described. The nipple 369 may have mounted therein a suitable normally closed valve for permitting removal of the bulb and tubing without exposing the cell to the atmosphere. The tubing 368 may be as long as desired for remote operation of the projector and in the event that utilization of the bulb is not desired, the tubing may be removed from the projector.

The electrical circuit and related structure for the projector along with the operation thereof will now be described. The projector and the included circuit is designed for semi-automatic and automatic operation and the knob 324 is designed for selectively conditioning the projector for either of these operations. The scale 326 for the knob 324 includes a scale marking 370 indicative of the semi-automatic condition of operation and when the index 328 has been turned opposite thereof, the end of the valve element 312 of the timer valve 296 is seated upon the conical passage 310 to prevent the flow of air to the bellows 292. With this arrangement of the parts, the normally open bellows switch 294 cannot be utilized since the bellows is not in condition for expansion. When the knob 324 is turned to either of the other scale markings, such as "slow" or "fast" or any position therebetween, the valve 296 will be utilized and the bellows disposed for operation in timed sequence. This then is indicative of automatic operation.

Figure 15:
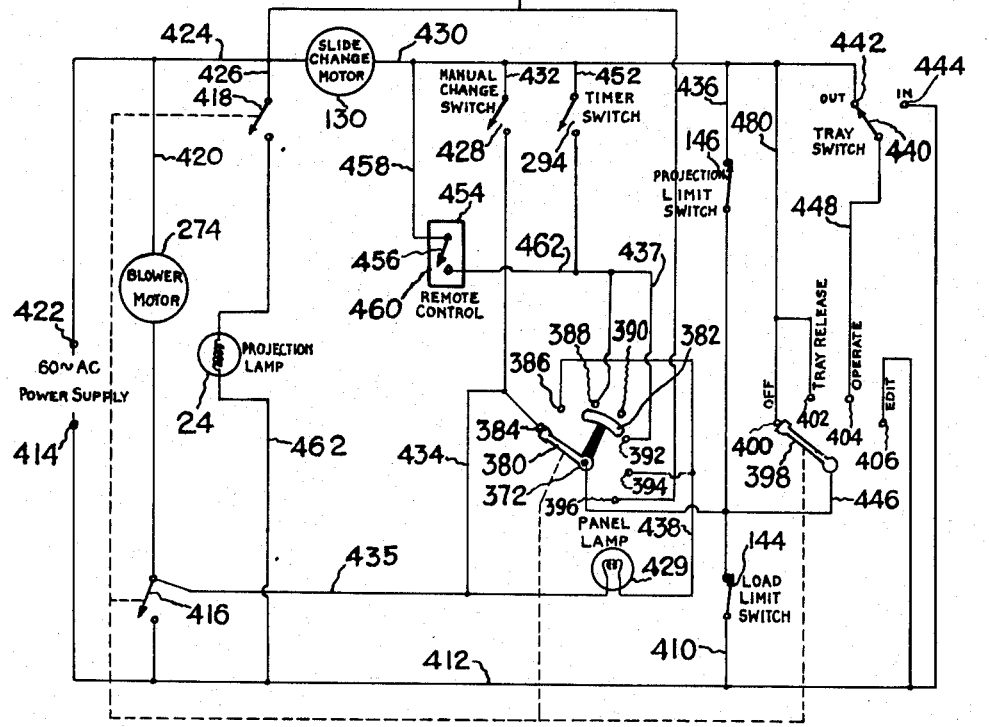
FIG. 15 is a diagram showing the various electrical circuits utilized in the present invention.

A selector switch 372 mounted upon the panel 20 and having a knob 374 associated therewith serves to control operation of the projector. The switch 372 is utilized in cooperation with indicia 376 embossed on the panel 20 and being indicative of the "Off"; "Tray Release"; "Operate" and "Edit" positions of the switch for facilitating desired operation of the projector. The switch 372 includes an insulated shaft 378 which is rotatable with the knob 374 and to which a contact arm 380 and a conductor sector 382 are connected for rotation therewith. The contact arm 380 is electrically insulated from the sector 382 and is cooperable with any one of four contacts 384, 386, 388 and 390 arranged in an arc on the switch. Similarly, the sector 382 is cooperable with contacts 392, 394 and 396 arranged in an arc having a radius slightly smaller than the radius of the arc for the arm 380. The arm 380 and the sector 382 turn together and therefore the angular distance relative therebetween, as shown in FIG. 15, will remain constant for all positions of these parts.

The selector switch 372 also includes another contact arm 398 and a bank of four contacts 400, 402, 404 and 406 cooperable therewith. The contact arm 398 is connected to the shaft 378 and therefore movable with the arm 380 and since the associated contacts are angularly spaced equally, the positioning of the arm 380 relative to one of its four contacts will cause corresponding positioning of the arm 398 relative to one of its four contacts.

The contact arms 380, 398 are electrically connected at a junction 408 to a common conductor 410 which is connected by a conductor 412 to one terminal 414 of a suitable source of electrical energy. The selector switch 372 also includes two single pole-single throw switches 416, 418 mechanically coupled to the shaft 378 and movable to closed position when the contact arm 380 is moved from the contact 384, which is the "off" contact for the projector, to any of its other contacts, namely, 386, 388, 390. The switch 416 is connected by a conductor 420 to the conductor 412 and thence to the terminal 414, and to the other terminal 422 of the electrical source by way of a conductor 424 for controlling the energization of the fan motor 274. The switch 418 is connected by a conductor 426 between the conductors 412 and 424 and serves to control the electric energy to the lamp 24. The remaining switch in the projector is a change switch indicated by the reference numeral 428 in FIGS. 1 and 15 and which must be actuated to the closed position in order to initiate operation of the projector. As shown in FIG. 1, the switch 428 may be mounted on the panel 20 for convenience to the operator. The switch is preferably of the normally open push button type which must be held in the closed position by the operator. Upon release, the switch will immediately revert to its open condition. A panel lamp 429 is mounted on the panel 20 for illuminating the same during certain stages of operation which require the use of the knobs on the panel.

For automatic operation of the projector, the timer knob 324 is turned until the index 328 is opposite a desired time interval as indicated by the scale marking 326 and the knob 374 is turned to the "Tray Release" position for closing the switches 416, 418 and thus permit the initial preheating of the first two or three slides. After a minute or two of this warm-up period, the knob is turned to the "Operate" position wherein the contact arms 380, 398 will be in engagement with the contacts 388, 404, respectively, and the sector 382 will bridge across the contacts 392, 394. A tray 82 of slides to be projected is introduced within the holder 16 and moved until the same engages and moves the stop 246 against the slot end 255. It will be assumed that the slide pickup and transfer mechanism 18 is in the load position as shown in FIG. 9 wherein the normally closed load limit switch 144 is held to an open position by the cam 136 and the normally closed projection limit switch 146 is free of the influence of the cam 138 and therefore is closed. In order to energize the motor 130 for actuating the transfer mechanism to the projection position with a slide, as shown in FIG. 10, the change switch 428 must be closed for the first action required to initiate operation of the projector. Energization of the motor 130 is then accomplished through a circuit traced as follows: terminal 422, conductor 424, motor 130, conductors 430, 432, switch 428, conductors 434, 435, switch 416, conductor 412 and terminal 414. The movement of the contact arm 380 to "Operate" position also closes a circuit for the panel lamp 429 for energizing the same, such circuit being traced as follows: terminal 422, conductor 424, armature for the motor 130, conductors 430, 436, normally closed limit switch 146, junction 408, contact arm 380, contact 388, conductor 437, contact 392, sector 382, contact 394, conductor 438, lamp 429, conductor 435, switch 416 and terminal 414.

As the transfer element 96 starts to move to projection position, the cam 256 will lower the member 238 to disengage the stop 246 from the tray and will actuate the contact button 250 of the switch 252 downwardly in order to move the contact arm 440 of this switch out of its normal engagement with a contact 442 and into engagement with a contact 444. This action connects the motor 130 in a different circuit for continued energization thereof, such circuit being traced as follows: terminal 422, conductor 424, motor 130, conductor 430, conductor 436, the normally closed projection limit switch 146, junction 408, conductor 446, contact arm 398, contact 404, conductor 448, contact arm 440, contact 444, conductors 450, 412, and the terminal 414. Once this circuit is completed, the change switch may be released and, in actual practice, the operator need only push the switch momentarily as the tray switch 252 becomes actuated almost immediately. The initial movement of the transfer element 96 will permit the normal closing of the load limit switch 144 to thereby short out the circuit to the panel lamp 429 and cause the same to become deenergized. Once the contact arm 440 of the tray switch 252 is in contact with the contact 444, the panel lamp 429 will remain shorted and therefore deenergized for the entire period in which the tray 82 is within the holder 16 and being indexed.

As the transfer element 96 approaches projection position, the projection limit switch 146 will be actuated by the cam 138 to an open position to thereby open the above circuit and terminate the energization of the motor 130. With the motor deenergized, the armature plate 148 will no longer be attracted thereby and will move upwardly to enable the locking pin 156 to engage the end of the crank arm 104 for positively stopping the movement of the transfer element 96 at projection position. See FIG. 10. In so moving the transfer element to this position, the link 106 will engage and rotate the crank arm 350 counterclockwise as viewed in FIGS. 9 and 10 for releasing the effect of the spring 360 upon the plate 338. The bellows 292 is now in condition to receive air therein for controlling automatic operation of the projector.

After a predetermined time interval, as set by the timer knob 324, the switch 294 will be actuated to a closed condition by the expansion of the bellows. Upon this occurrence, the motor 130 will become energized to attract the armature plate 148 and free the crank arm 104 for rotation. Energization of the motor 130 is traced as follows: terminal 422, conductor 424, motor 130, conductors 430, 452, timer switch 294, contact 388, contact arm 380, junction 408, normally closed load limit switch 144, conductors 410, 412 and terminal 414. When the transfer element 96 travels a short distance past the projection position the timer switch 294 will open because of the venting of air from the bellows 292, however, at this position of the transfer element, the cam 138 will have rotated enough to permit the normal closing of the projection limit switch 146 for maintaining the energization of the motor 130. This cycle of operation will move the transfer element back to a return position over the tray 82 in order to return the projected slide, pick up another slide and carry the same to the projection position as the tray is advanced the distance equal to the distances between slides in the tray. This cycling of the operation of the projector will continue until all of the slides S have been projected or the projector is shut off or the knobs 328 and 374 are manipulated for other operations. During automatic operation while all the slides in the tray are being projected, the circuit for the energization of the motor 130 will alternate with the closing of the timer switch 294 and the load switch 144 on the one hand and the closing of the projection switch 146 on the other hand.

When the tray 82 has been advanced until the last slide is in load position, the stop 246 will continue to be held in its lower position by the side of rack 216 but will be at the extreme end thereof ready for upper movement upon the slightest advance movement of the tray. The size of the slot 248, or at least the distance between the ends 254, 255 of the slot, is such that the stop will remain in its lowered position until the last slide has been projected and returned to its position within the tray. Upon this occurrence, as the tray commences to be advanced, the stop will immediately rise, and the contact arm 440 of the tray switch 252 will move to the contact 442 thus opening the circuit to the motor 130 while the transfer element is in load position. Simultaneously with this action, the panel light 429 will once again become energized to illuminate the panel 20. The circuit for the lamp is established since the shorting effect of the load limit switch 144 and the tray switch 252 is eliminated and the projection limit switch 146 is closed.

In this condition of the projector, the tray 82 may be removed manually from the holder 16 and another tray inserted or the projector may be shut off merely by rotating the switch 372 to the "Off" position.

In the event semi-automatic operation is now desired, the same operation may be accomplished by the manual manipulation of the change switch 428 while the operator is in the vicinity of the projector by the manual squeezing of the pneumatic bulb 367 at a remote point, or with a remote switch. As shown in FIG. 15, the remote switch 454 includes a contact arm 456 connected to the conductor 430 by a conductor 458 and a contact 460 connected by a conductor 462 to the contacts 388, 392 of the selector switch 372. As previously stated, the actuation of the change switch 428 is required in order to commence automatic operation of the projector. This step is also required for semi-automatic operation when utilizing the bulb 367 or the remote switch 454. Upon actuation of the change switch, the transfer element will stop in the projection position with a slide which may be projected as long as desired. In order to return this slide to the tray and pick up another for projection, the operator need only actuate the change switch each time that a new slide is desired. The circuit for this operation has been previously traced and further description thereof is unnecessary.

In the event that remote control is desired, the closing of the remote switch 454 closes the circuit for the motor 130 as follows: terminal 422, conductor 424, motor 130, conductors 430, 458, switch 454, conductor 462, contact 388, arm 380, junction 408, switch 144, conductor 412 and terminal 414. This closing of the switch need only be made momentarily since the initial movement of the transfer element 96 from the projection position will permit the normal closing of the projection limit switch 146 and the circuit to the motor 130 will be maintained. The panel lamp 429 will remain off during the showing of the tray regardless if the change switch or remote switch is being utilized.

When the last slide of a tray has been returned, whether automatic or semi-automatic operation is utilized, the transfer element 96 will always return to a load position, since the tray switch 252 is allowed to assume its tray-out condition, that is, the contact arm 440 will become disengaged from the contact 444. Under these circumstances, there can be no energizing circuit for the motor 130. On the other hand, when a tray is in a position within the holder 16, stopping of the transfer element 96 will always occur at the projection position.

In the event editing or viewing of single slides is desired, the selector switch 372 is manipulated to the "Edit" position, that is, to a position wherein the contact arm 380 is against the contact 390 and the contact arm 398 is against the contact 406. Assuming that there is no tray within the holder, this action will move the transfer element 96 to the projection position where it will remain and showing of a single slide may be had simply by dropping the same within the slide receptacle 30. The circuit for the motor 130 for this operation is as follows: terminal 422, conductor 424, motor 130, conductors 430, 436, switch 146, conductor 446, contact arm 398, contact 406, conductor 412 and terminal 414. When the transfer element reaches projection position, the projection limit switch 146 will be actuated to its open position to open this circuit and stop further movement of the transfer element.

While viewing single slides in this fashion, the panel lamp 429 will be on so that the operator may make preliminary studies of the slides to be so projected. The circuit for the lamp is as follows: terminal 422, conductors 424, 464, contact 396, sector 382, contact 394, conductor 438, lamp 429, conductor 435, switch 416 and terminal 414. The slide may be removed from the receptacle 30 merely by depressing the tab 264 on the panel 20, such action serving to rotate the edit lever 260 for moving the flat portion 268 upwardly and against the lower edge of the slide thereby lifting the same out of the receptacle.

In FIG. 13, there is shown an interlocking mechanism which will prevent the rotation of the lever 260 except when the selector switch 372 has been rotated to the "Edit" position. This mechanism takes the form of a locking lever 470 which is rotatably mounted intermediate its ends on the index shaft 200. The lever is positioned generally vertically and has a protruding shoulder 472 at the lower end thereof for engagement with the lower edge of the lever 260. Rotation of the lever by means of the tab 264 is thus prevented. Mounted on the shaft 378 for the selector switch 372 is a circular plate 474 which is formed with a radially extending tooth 476. The tooth is adapted to engage the upper end of the lever 470 to rotate the same out of locking engagement with the lever 260 when the shaft has been rotated to a certain position. This position is determined when the selector switch is in "Edit" position or that position where the contact arms 380, 398 are rotated to engage the contacts 390, 406, respectively. With this arrangement, the edit lever 260 can only be utilized when editing is desired and the selector switch turned to condition the parts therefor. For all other positions of the selector switch, the lever 260 is locked and inadvertent rotation of the lever with consequent damage to the slide transfer mechanism is avoided.

The selector switch 372 has another operating position between the "Off" and "Operate" positions thereof and is utilized for tray release in the event that it is desired to remove the same before it has been normally indexed or advanced through the tray holder. This may be accomplished whether the projector is being operated automatically or by the remote or change switches. Since the transfer element comes to rest in the projection position when a tray is being utilized, the selector switch may be rotated to the "Tray Release" position or that position where the contact arms 380, 398 engage the contacts 386, 402, respectively. In this case, the projection lamp 24 and the fan motor 274 will remain energized and the transfer element 96 will move to the load position and stop. This movement of the transfer element is accomplished by a circuit traced as follows: terminal 422, conductor 424, motor 130, conductor 430, conductor 480, contact 402, arm 398, conductor 446, switch 144, conductors 410, 412 and terminal 414. Upon reaching load position, the transfer element will come to rest since the load limit switch, in the above circuit, will be actuated to an open position. A tray may now be removed and either another inserted or further operation of the projector terminated which is accomplished by rotating the selector switch to the "Off" position after removal of the tray. When the switch is rotated to the "Tray Release" position, the panel lamp 429 will be energized through a circuit which includes the contact 386. The "Tray Release" position is also utilized to interrupt projection of a slide tray at any position of the tray in its holder. When the switch 372 is in "Tray Release" position, the transfer element will return to load position and stop to thereby permit removal of the tray at any position thereof.

The foregoing description of the electrical systems indicates the versatility of the present projector for various projection operations. Control for automatic operation is provided in addition to controls which will enable manual operation while the operator is either at the projector or at a distant location. The electrical system also includes a circuit for a panel lamp which is energized generally only when the other control knobs are to be manipulated thus giving the operator a source of illumination when this is required. At other times, such as during projection of a tray full of slides, the panel lamp is shorted out since there is no need for an illuminated panel at this time.

From the foregoing description, it will be appreciated that the present invention provides a unified and compact structure which is adapted to receive a slide tray carrying a plurality of slides and individually remove each of the slides from the slide tray, project the same, return it to its former position within the tray, and advance the tray for another cycle of operation. While there is in this application specifically described one form which the invention may assume in practice, it will be understood that this form is shown for purposes of illustration, and that the same may be modified and embodied in various other forms or employed in other uses without departing from its spirit or the scope of the appended claim.

I claim:

Timer mechanism for a blower equipped slide projector comprising in combination, a bellows consisting of an inflatable container made of a flexible elastomeric sheet material, a switch, means mounting said container upon a fixed wall of the projector adjacent said switch, a relatively rigid plate secured against said container on the opposite side thereof from the fixed wall and movable by the container to close said switch upon expansion of said container to a predetermined extent, adjustable flow restrictive passageway means directing air from the output of the blower into said container for expanding it, hand operated means including a compressible bulb and tubing connecting said bulb to said container providing an additional volume of air to said container and accelerating expansion of said container in response to hand pressure to close said switch, means including a relief valve responsive to the closing of said switch for compressing said container and exhausting air therefrom thereby to ready said timer mechanism for another timing cycle.

References Cited in the file of this patent

UNITED STATES PATENTS

| | | |
|---|---|---|
| 831,599 | Browne | Sept. 25, 1906 |
| 1,181,201 | Akeley | May 2, 1916 |
| 1,273,661 | Perry | July 23, 1918 |
| 1,318,255 | Bernard | Oct. 7, 1919 |
| 1,464,307 | Bowlus | Aug. 7, 1923 |
| 1,566,260 | Halvorson | Dec. 15, 1925 |
| 2,180,287 | Zwack | Nov. 14, 1939 |
| 2,445,929 | Sturgess | July 27, 1948 |
| 2,456,711 | Knutson et al. | Dec. 21, 1948 |
| 2,491,361 | Burdick | Dec. 13, 1949 |
| 2,666,509 | Jaggi | Jan. 19, 1954 |
| 2,691,320 | Borberg | Oct. 12, 1954 |
| 2,711,118 | Briskin et al. | June 21, 1955 |
| 2,711,602 | Wiklund | June 28, 1955 |
| 2,753,023 | Marvin | July 3, 1956 |
| 2,770,941 | Flagiello | Nov. 20, 1956 |
| 2,833,976 | Kennedy et al. | May 6, 1958 |
| 2,854,773 | Geiger | Oct. 7, 1958 |
| 2,854,888 | Kaye | Oct. 7, 1958 |
| 2,872,541 | Oppenheim et al. | Feb. 3, 1959 |
| 2,898,807 | Ewald | Aug. 11, 1959 |
| 2,907,128 | Norton | Oct. 6, 1959 |
| 3,005,887 | Robson | Oct. 24, 1961 |

FOREIGN PATENTS

| | | |
|---|---|---|
| 58,171 | Denmark | Nov. 4, 1940 |

OTHER REFERENCES

German Application No. L 18,460 IX/42H, June 28, 1956.